US010390646B1

(12) United States Patent
Cox

(10) Patent No.: US 10,390,646 B1
(45) Date of Patent: Aug. 27, 2019

(54) TOOL FOR REACHING AND MANIPULATING STRAPS AND OTHER OBJECTS

(71) Applicant: Kristin Andrea Cox, Boise, ID (US)

(72) Inventor: Kristin Andrea Cox, Boise, ID (US)

( * ) Notice: Subject to any disclaimer, the term of this patent is extended or adjusted under 35 U.S.C. 154(b) by 0 days.

(21) Appl. No.: 16/006,336

(22) Filed: Jun. 12, 2018

Related U.S. Application Data

(60) Provisional application No. 62/530,738, filed on Jul. 10, 2017.

(51) Int. Cl.

| | |
|---|---|
| ***B25J 1/04*** | (2006.01) |
| ***A47G 25/90*** | (2006.01) |
| ***B25G 3/18*** | (2006.01) |
| ***B25G 1/04*** | (2006.01) |

(52) U.S. Cl.
CPC ............... *A47G 25/90* (2013.01); *B25G 1/04* (2013.01); *B25G 3/18* (2013.01)

(58) Field of Classification Search
CPC ............. A47G 25/90; B25G 1/04; B25G 3/18
USPC .................................................... 294/26, 175
See application file for complete search history.

(56) References Cited

U.S. PATENT DOCUMENTS 1,334,976 A * 3/1920 Tipping ................. A47G 25/90 223/111
3,048,139 A * 8/1962 Duckett .................. B63B 21/54 114/221 R
3,591,226 A * 7/1971 Elmore, Jr. ............ A47G 25/82 294/104
3,860,156 A 1/1975 Lawrence
3,936,088 A * 2/1976 Williams ................... B25J 1/04 294/175
4,067,487 A 1/1978 Carr et al.
4,072,255 A 2/1978 Bogorad
4,709,839 A * 12/1987 Tucker ................... A47G 25/82 223/119
4,911,039 A * 3/1990 Lubbock ................. B25B 13/48 16/429
5,351,365 A * 10/1994 Hauck ...................... B65G 7/12 16/422

(Continued)

FOREIGN PATENT DOCUMENTS

WO 2012/177819 A1 12/2012

*Primary Examiner* — Paul T Chin

(74) *Attorney, Agent, or Firm* — Pedersen & Company, PLLC; Ken J. Pedersen; Barbara S. Pedersen

(57) ABSTRACT

An elongated tool includes at least one of a specially-adapted tool handle/shaft and/or a specially-adapted tool head that may be used for reaching and manipulating objects, for example, for reaching a clothing portion such as a strap or a bra strap. The tool may have various quick-connect tool heads for adaptation to reach and manipulate different objects, such as different strap sizes and materials. The tool handle may have massaging bumps to reduce skin friction, potential scrapes, and/or fabric snags, and/or to increase direct path accuracy when routing tool along a user's skin and/or along a clothing surface. The preferred tool heads have multiple hooks shaped and curved for optimal control and capture of various clothing portions and/or straps. The tool may aid both abled-bodied and physically-challenged persons to remove or put on a bra, and/or otherwise undress or dress, in a comfortable, convenient, and/or discrete or private manner.

19 Claims, 11 Drawing Sheets

(56) References Cited

U.S. PATENT DOCUMENTS

| | | | | |
|---|---|---|---|---|
| 5,471,696 | A * | 12/1995 | Linfoot | A47L 13/00 15/104.001 |
| D371,231 | S | 7/1996 | Traber et al. | |
| 5,566,868 | A | 10/1996 | Mariscal et al. | |
| 5,687,889 | A | 11/1997 | Liden | |
| 5,975,386 | A | 11/1999 | Fernicola | |
| 6,163,937 | A | 12/2000 | McKinnis et al. | |
| 6,328,048 | B1 | 12/2001 | Rivera | |
| 8,708,385 | B2 * | 4/2014 | Dion | B60R 11/06 294/104 |
| 2002/0139819 | A1 | 10/2002 | Ferraioli | |
| 2008/0217365 | A1 | 9/2008 | Fox | |

* cited by examiner

TOOL FOR REACHING AND MANIPULATING STRAPS AND OTHER OBJECTS

This application claims benefit of Provisional Application 62/530,738, filed Jul. 10, 2017, entitled Tool for Reaching and Manipulating Bra Strap, the entire disclosure of which is incorporated herein by this reference.

BACKGROUND

Field of the Invention

The invention relates to an elongated, hooked reaching and manipulating tool that is particularly well adapted for use with clothing straps and particularly with bra straps. The tool may be used to remove a bra without first having to remove a long-sleeved shirt worn over the bra, and/or when the user cannot or does not want to use only her hand(s) to reach and manipulate the bra straps. The invention is adapted to be especially useful in one or more of the following scenarios: during cold winter months when removing a shirt can be uncomfortably cold, in locations where there is no private area to remove the bra, and/or when the user is not agile or flexible enough to reach bra straps and/or other clothing portions without the aid of a tool.

Related Art

Many prior dressing and undressing tools have been developed to assist primarily handicapped individuals who struggle with very basic tasks, such as applying or removing their clothes in traditionally-prescribed layers, that is, applying/dressing from bottom-to-top (inner to outer layers), and removing/undressing from top-to-bottom (outer to inner layers). Some prior dressing or undressing tools have been designed for use specifically for use with shoes and/or buttons. Drawbacks to existing tools include being entirely rigid in construction, being uncomfortable and/or clumsy to use, having only a single conventional hook, and/or having little or no versatility for uses other than the specific use for which they were designed.

SUMMARY OF THE INVENTION

The invention comprises an elongated tool comprising at least one of a specially-adapted tool handle/shaft and/or a specially-adapted tool head that may be used for reaching and manipulating objects, for example, for reaching a clothing portion such as a strap or a bra strap. Certain embodiments enable individuals to remove a bottom-layered bra undergarment without first having to remove a top layer of clothing, such as a shirt over the bra. Certain embodiments allow for body heat provided by the top layer of clothing to remain intact while removing the bra undergarment relatively easily. Certain embodiments allow for privacy and discrete partial undressing. Certain embodiments may be useful for other purposes that require or benefit from excellent control and capture of an object in an elongated, hooked device.

The invented tool includes one or more, and in certain embodiments all, of the following features:

A) the handle, which may be made up of one or more handle portions (or one or more "shafts") and/or tool head (or "hook end") is/are generally planar, thin, non-cylindrical;

B) the handle and/or tool head is/are partially flexible, resilient, strong, and sturdy, with soft, rounded edges;

C) the tool is simple and intuitive to assemble and use;

D) the tool is adjustable by means of having quick-connect and quick disconnect fasteners for different handle types/lengths, and/or different tool heads;

E) the tool can be assembled by quick-connecting/snapping together one, or more, identical shafts to extend total shaft length, thus accommodating different arm lengths, and by connecting/snapping one or more different tool heads to the shaft(s) for adaptation to reach and manipulate different objects, such as different strap sizes and material variations including wide, thin, thick, elastic, lace, etc;

F) the tool components quick-disconnecting/snapping apart for easy storage, portability and retrieval of the components;

G) the handle and/or tool head has/have massaging bumps to reduce skin friction, potential scrapes, and/or fabric snags, and/or to increase direct path accuracy when routing tool up or down length of arm; and/or H) the tool has double, triple, quadruple, or more hook-heads, preferably on each end of the handle for optimal control and capture of various straps, clothing portions, and/or other object.

Therefore, objects of certain embodiments include providing a tool that allows reaching and manipulation of objects that may be captured in a hook, such as clothing and especially a bra strap, to aid both abled-bodied and physically-challenged persons. Objects of certain embodiments include the methods of these tasks being comfortable, convenient, and/or discrete or private.

DETAILED DESCRIPTION OF CERTAIN EMBODIMENTS

Figure 1:
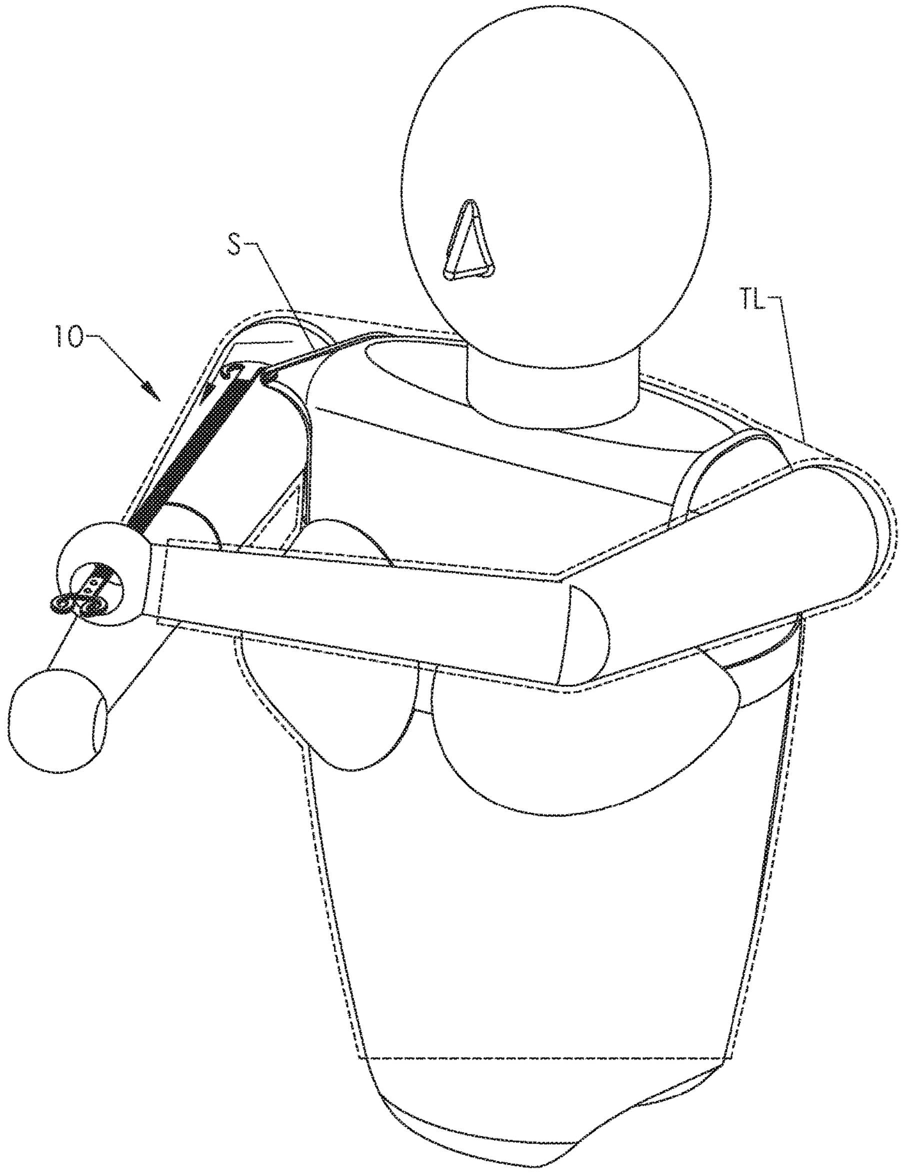
FIG. 1 is a front perspective view of a user employing one embodiment of the invented tool.

Referring to the Figures, there are shown several, but not all, embodiments of the invented tool and its components. Certain embodiments of the invented reaching and manipulating tool allows users the ability to reach and manipulate various objects, including clothing and straps The preferred embodiments of the tool comprise: a) the entire tool being flat, thin, partially flexible, resilient, strong, and sturdy, with soft, rounded edges; the tool being simple and intuitive to assemble and use; and the tool being adjustable because it has quick-connect and quick-disconnect fasteners and interchangeable modular parts, to accommodate different user body types and/or different hooked straps or other objects and for easy storage, portability and retrieval. Said adjustability allows the user to quick-connect/snap together and assemble one, or both, preferably-identical handle portions/shafts to extend total handle length, thus accommodating different arm lengths and/or locations of the strap/object. Said adjustability allows the user to select a preferred or optimal tool head or "hook end" for various objects, such as strap or bra strap size and material variations. For example, the user can choose from multiple different tool head/ends, preferably each comprising multiple hooks, for wide, thin, thick, elastic, lace, and/or other straps. Further, the preferred embodiments of the tool comprise texture massaging bumps to reduce skin friction, potential scrapes, fabric snags, plus to reduce sticking-to or catching on the skin for increased comfort and increased direct-path accuracy when moving the tool along/against the skin, for example, when routing tool up or down length of arm inside a long-sleeved shirt.

The preferred tool comprises double-, triple-, and/or quadruple- (or more) hook heads, preferably on each end, for optimal control and capture of an object, such as a strap or bra strap; this way, the user may reach a strap or other object from multiple directions to capture it in any of multiple hooks, depending on the location and/or attributes of the strap/object. For example, the user may reach a bra strap from multiple directions and still capture the strap effectively in one of the multiple hooks. In certain embodiments, one of the multiple hooks may be large than the other(s) on the same hooked tool head, and this may provide additional versatility of the tool.

A preferred use of certain embodiments of the tool is to use it for removing a bra from underneath a top layer of clothing, that is, without having to remove the top layer of clothing. Traditional bras have two straps, which are placed individually over each shoulder in order to anchor the bra evenly around the body. Each strap is firmly sewn in place on the bra, and goes from the top of the bra cup located at the top of the breast, then up over that corresponding shoulder, and then down to the mid back where the other end of the strap is once again firmly sewn in place to the back of the bra band.

The current and most common way to remove a bra, due to anatomical challenges and/or the typical size, shape, location, and tightness of the bra, is to remove the top layer of clothing first. Depending on the construction of the long-sleeved shirt, there are instances when, in an attempt to avoid removing the top layer of clothing first, a wearer is able to pull their arms out from the long sleeves and thus release the bra straps from their arms while their arms are loose under the shirt body. However due to pulling arms from long sleeves, many times the seam of the shirt located at the arm pit can be jeopardized and torn as a result of this maneuvering (because of the width of an arm folded at the elbow, negotiating through a smaller arm sleeve). Therefore, without the use of certain embodiments of the invented tool, it is extremely difficult and most of the time considered impossible, to remove binding bra straps from arms without first removing the top layer shirt.

There are common locations and instances that it is desired to remove the bra out from under the top layer shirt without removing the top layer shirt. For example, such locations and instances may include a cold location, a semi-public or even public location, a camping or recreational site, a spa or massage facility, a room of a medical facility, an assisted living center or other extended care facility, or even a home. The reasons for this may include the need or desire to maintain body warmth, or to maintain or improve privacy and/or politeness in the presence of others. Therefore, certain embodiments of the invented tool are particular useful as a bra strap reaching and manipulating tool, for example, to conserve body heat, to maintain a top layer clothing integrity (not damaging their clothes by trying to slip their arms from the sleeves) plus to manage inconvenience when there is no private designated area to undress. This tool is customizable for various bras and bra straps, and the tool may be easily dismantled, transported and stored. As a bra-removal tool, the tool may save time, money (replacing damaged clothing) and enable bra-wearers to be more comfortable and relaxed by conserving body heat in the colder temperatures and eliminate the requirement to completely disrobe their top half when simply wanting to remove a bra.

In use as a bra-removal tool, the tool is inserted at the wrist, under the end of the wearer's long sleeve, and next slid easily up along the length of the arm to the place where the bra strap can be reached, looped into one or another of the preferably-multiple hooks at the end of the tool (the hook end that has been moved to the strap) either entirely by manipulating the tool head hook against/under the bra strap or by the user inserting the other hand under the top layer shirt, typically at the collar, to help place the strap in the tool head hook. The bra strap is pulled off the shoulder by manipulation of the tool and/or by said users' hand through the shirt collar opening. Then, the user pulls the tool and therefore the captured strap back down the wearer's arm, out from under the long sleeve and over and around that hand, thus releasing the strap from wearer's arm.

The tool can also be used, generally in reverse order of the above process, to put on a bra underneath a long-sleeved shirt which is already being worn. For example, a user may fasten the bra clasp(s) underneath the shirt, slip the bra strap up toward the arm-pit and/or top end of the sleeve, to be captured in a hook of the tool that has been slid up into the sleeve to grasp the bra strap near the arm-pit. Then, the tool is used to pull the strap down the arm, out through the sleeve opening, and around the hand. Then, the tool may be used to push the strap up to the user's shoulder.

Therefore, one method of using the tool, for bra-removal out from under a top layer of clothing, is as follows:

a) Unhook back or front of bra (while FIGS. 1, 1A and B suggest the bra clasped at the back, it may be unclasped, which will provide a looser bra and typically greater ease of performing the following steps);
b) From collar of shirt, push bra straps off top of shoulder(s);
c) Insert tool under shirt sleeve at the upper surface of the wrist;
d) Push and guide tool up under the sleeve and along the arm until able to hook bra strap with the help of other hand reaching under shirt at shoulder/neck opening/rim;
e) Pull strap slowly down arm using tool;
f) Maneuver elbow though strap;
g) Continue guiding strap down arm and out from under sleeve at wrist;
h) Lastly pull strap over and around the hand, thus releasing bra strap from arm; and
i) Repeat process on other arm.

It will be understood that certain methods, such as that immediately above, will utilize both the tool and the user's second hand to accomplish the method. However, certain users may be able to use only one hand, for example, capturing the strap S in the hook while it is still on the shoulder (see FIG. 1, for example), and then pulling the strap off the shoulder (see arrow in FIG. 1 and the strap location in FIG. 1A) before continuing by pulling the strap down the arm and sleeve of the top layer TL toward the sleeve opening (FIG. 1B).

Figure 1A:
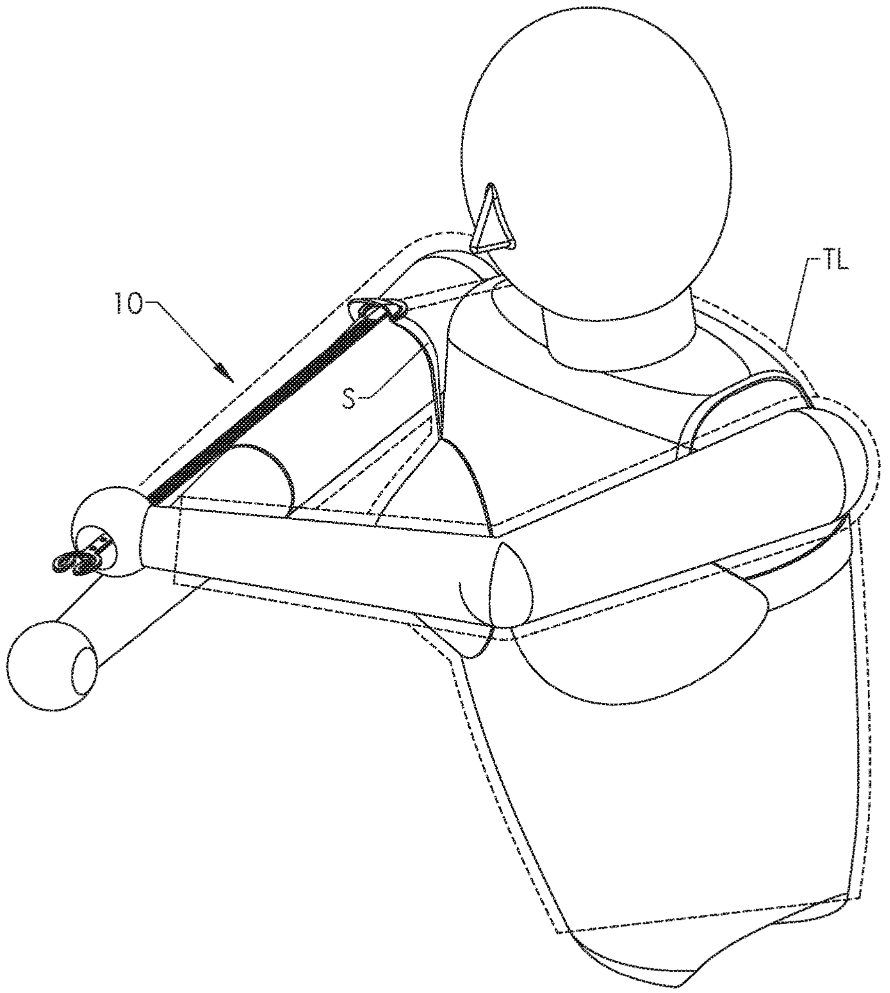
FIG. 1A is left perspective view of the user of FIG. 1 continuing to use the tool of FIG. 1, wherein the bra strap has been pulled/pushed off the shoulder and part of the strap is in dashed lines to show it is hidden behind the shoulder/arm, and the user is beginning to pull the bra strap down along the arm.
Figure 1B:
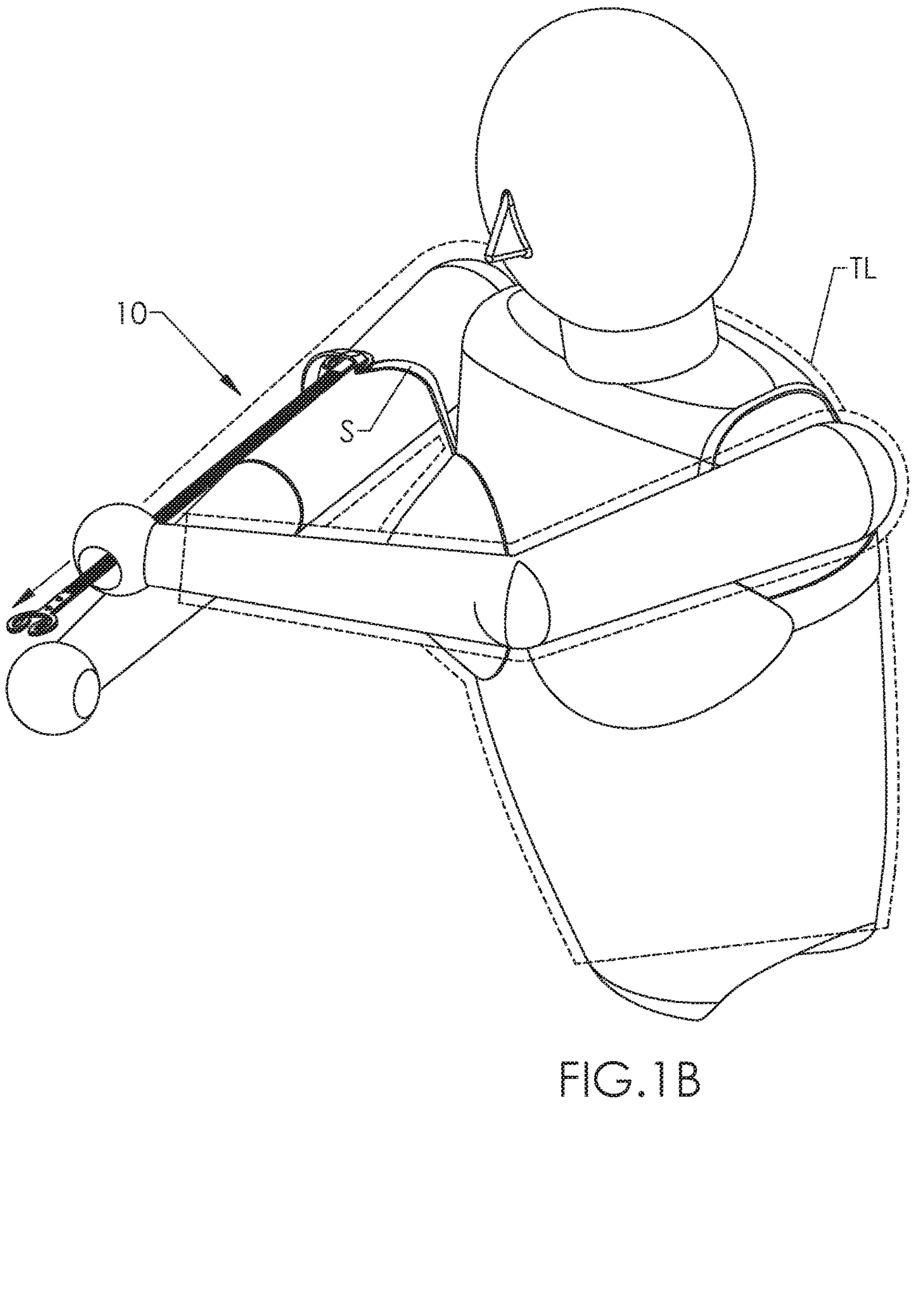
FIG. 1B is a left perspective view of the user of FIG. 1 using the tool of FIG. 1 to continue pulling the bra strap down along the arm, in order to pull the bra strap out from under a top layer shirt sleeve. It may noted that the bra in FIGS. 1, 1A and 1B may be unclasped at the back, for example, which would loosen the bra and make it easier to pull the bra strap along the arm with the tool.
Figures 2, 3:
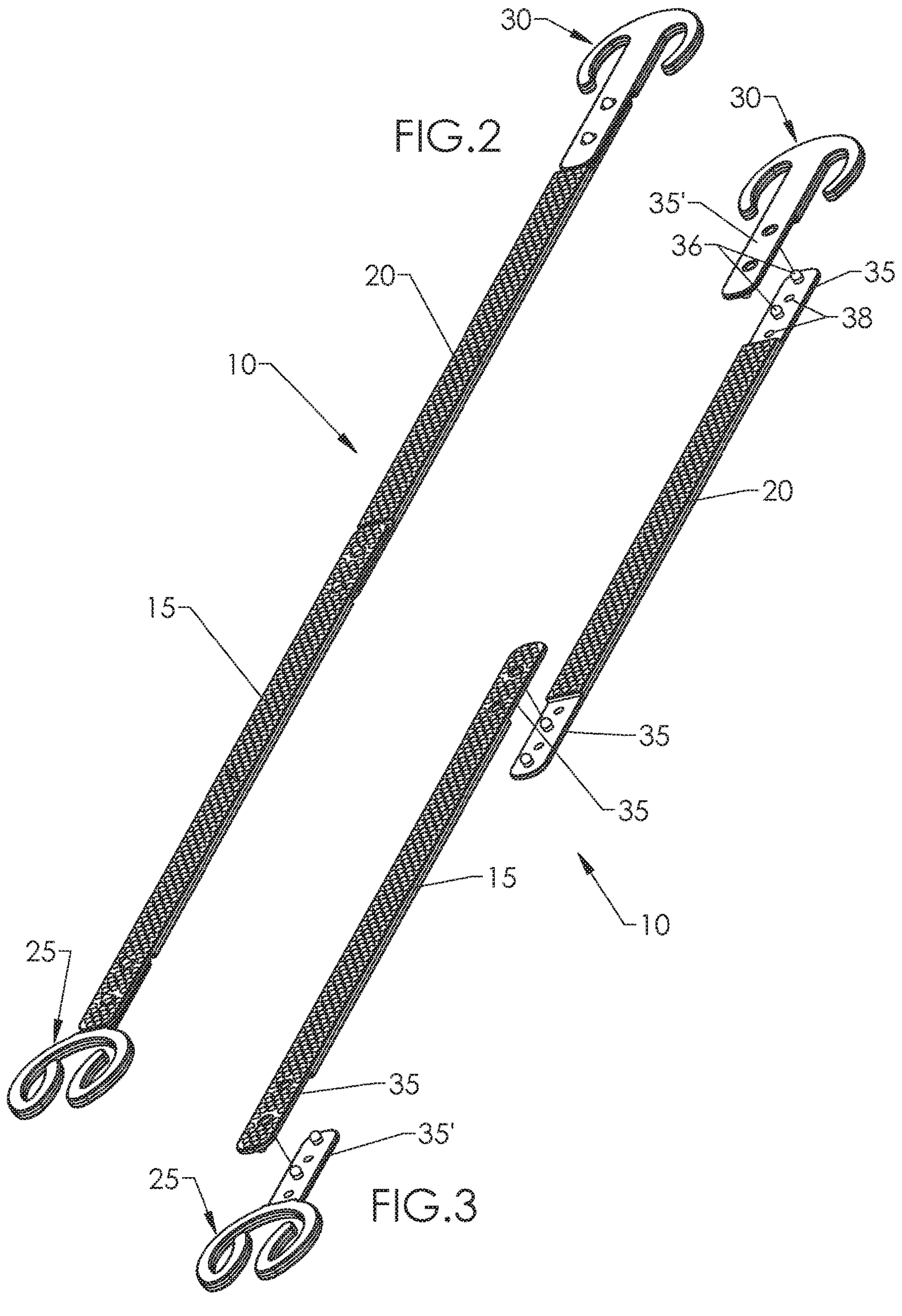
FIG. 2 is a perspective view of the tool of FIG. 1 (flipped over on its longitudinal axis compared to the tool orientation in FIGS. 1 and 1A), enlarged compared to FIG. 1 to better show the two different tool heads on the proximal end and the opposing distal end of the handle.
FIG. 3 is an exploded, perspective view of the tool of FIG. 2, exploded by disconnecting the quick-connect fasteners between the two handle portions, and between the handle portions and the tool heads, wherein it may be seen from this figure that the two handle portions the same and are interchangeable in the assembly.
Figure 6:
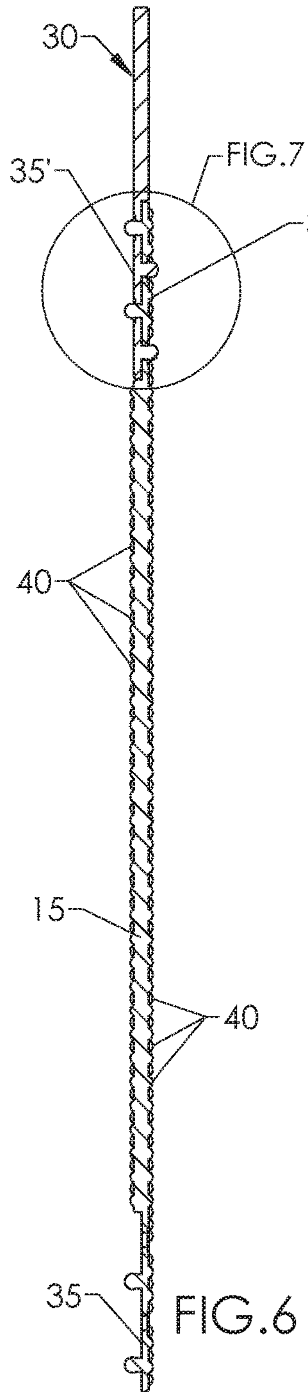
FIG. 6 is a cross-sectional view of the embodiment of FIG. 4, viewed along the line 6-6 in FIG. 5.
Figure 7:
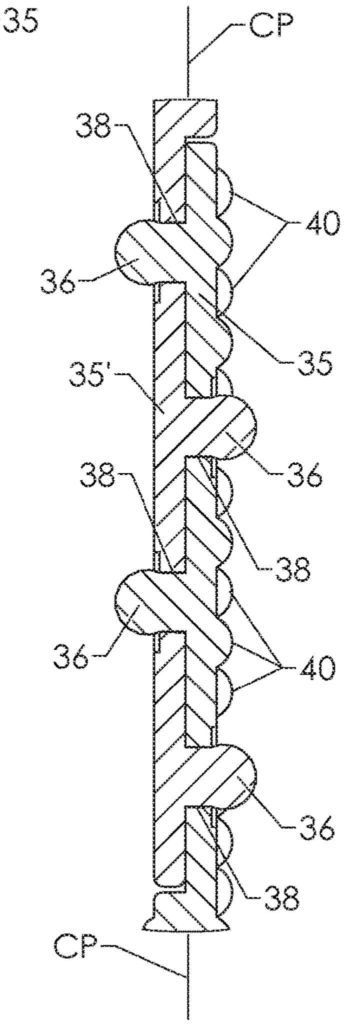
FIG. 7 is an enlarged detail of the circled portion of FIG. 6.

Referring Specifically to the Figures:

In FIGS. 1, 1A and B, 2 and 3, there is shown an embodiment of the tool 10 that comprises two handle portions (or two "shafts") and two different tool heads (or "hook ends"). Specifically, the tool 10 includes a proximal handle portion 15 connected to a distal handle portion 20, and a first double-hook tool head 25 detachably connected to the outer end of the proximal handle portion 15 and a different, second double-hook tool head 30 detachably connected to the distal handle portion 20. Handle portions 15 and 20 are the same in this tool 10, that is, they are identical or "duplicates", for modularity and simplicity of manufacture. In certain embodiments, the handle portions may be the same except for being different lengths. Each end of each of the handle portions 15, 20 includes a fastener portion 35 for quick-connection and quick-disconnection. The preferred fastener portion 35, and cooperating tool head fastener portions 35' each comprise snap members that include protruding snap portions 36 and snap-receiving apertures 38. The protruding snap portions 36 and the receiving apertures 38 cooperate to detachably fasten the two handle portions 15, 20 together, and also to detachably fasten handle portions 15, 20 to the fastener portions 35' of selected tool heads 25, 30, respectively, as illustrated in FIGS. 2 and 3. FIG. 3 shows to best advantage how the handle portions 15 and 20, while being identical, are connected by flipping one over relative to the other for connection of their fastener portions (one fastener portion 35 of each handle portion 15, 20) midway along the length of the two-shaft handle. The tool heads 25 and 30, with one flipped over relative to the other, are connected at their fastener portions 35' to the outermost fastener portions 35 of the handle portions 15, 20, as will be readily understood from FIG. 3. FIGS. 6 and 7 show to best advantage the details of the preferred snap-together fastener portions 35, 35', wherein two of the protruding snap portions 36 snap-into two cooperating snap receiving apertures 38, for each of the fastener portions 35, 35', resulting in each connection being formed by a total of four "snaps".

It may be noted that a single handle portion, for example, either of portions 15 or 20, may be used as the entire handle. A single tool head may be connected to the short handle (see FIG. 4, for example). Or, each end of a single portion 15 or 20 may be connected to tool heads, to create a tool assembly with two tool heads and a single-length handle that is about half the length of the tool 10 in FIG. 1, for example, for a person with short arms and/or for uses other than that shown in FIG. 1.

Each end of each handle portion (or each 'shaft") preferably has the same snap-based fastener portion 35, for example, comprising two protruding snap portions 36 spaced apart on the length of the fastener portion 35 and alternating with two receiving apertures 38. Tool heads 25, 30 preferably all have identical fastener portions 35', which are also identical to the fastener portions 35 of the handle portions. Thus, all of preferred fastener portions 35, 35' have the same position of protruding snap portions 36 and snap receiving apertures 38. This allows either end of any of the handle portions to snap to any end of another handle portion, and any exposed handle portion end (handle portion fastener portion) to snap-connect to any selected tool head's fastener portion. In other words, preferably, all the handle portions/shafts are interchangeable and all the tool heads are all interchangeable on any of the handle portions/shafts. See, for example, the tool head 25 snapped to proximal handle portion 15, and tool head 30 snapped to distal handle portion 20 on tool 10 in FIG. 1. See also, in FIG. 4, tool head 30 is being snapped onto proximal handle portion 15, in place of tool head 25. Thus, the preferred snap fastener system is beneficial for modularity and interchangeability. In certain embodiments, alternative fastener systems may be used, such as side squeeze plastic clips and plastic insert buckles.

The tool 10, including multiple handle portions/shafts and the tool heads, is preferably made of polymeric material(s) ("plastic") using plastic injection molding. The tool 10, and/or tool kit for assembling the tool 10, will comprise one or more handle portions/shafts and one or more tool heads, for example, for a total of 2-10 components. A preferred combination of components is 2 shafts plus 2-8 tool heads, or more preferably 2 shafts and 4 tool heads. If the components shown in FIGS. 2 and 3 and 11-13 are provided, the tool kit will be 2 shafts and 4 different tool heads (described in more detail below), or a total of 6 pieces, for example. The tool 10 handle/shaft(s) and the tool head(s) are each generally planar, thin, elongated, partially flexible, resilient, strong and sturdy, and preferably have rounded edges. For example, the handle/shafts are thin in that they are preferably about 1/16 inch thick from their front (connector) side to their rear side (right to left in FIG. 6, thickness T in FIG. 14), and narrow in that they are preferably about ½ wide (from right to left in FIG. 5, and width W in FIG. 13). For example, the handle is elongated in that it is preferably about 18.5 inches long including the handle's outer fastener portions when two identical shafts are assembled together, because each shaft is about 10 inches long and the middle fastener portions 35 that connect the two shafts are each about 1.5 inches in length and overlap about 1.5 inches when connected. When one shaft is used as the handle, the handle is therefore about 10 inches long including both of its opposing fastener portions. Thus, the handle/shaft is/are much longer than thick and much longer than wide. Each of the handle portions/shafts, the handle, the tool heads, and the entire tool, may be said to each have a longitudinal axis, all of which longitudinal axes are preferably coaxial (the same). Therefore, the longitudinal axis LT of the entire tool, and the longitudinal axis LH of the handle, shown in FIGS. 5 and 13 respectively, are coaxial. Further, the longitudinal axis of each tool head is also preferably coaxial with longitudinal axes LT and LH. Extending through the longitudinal axes LT and LH is the central plane CP of the handle portions/shafts, the handle, the tool heads, and the entire tool. It will be understood that the central plane CP is parallel to the sheet of FIG. 5, extending into the sheet in FIGS. 6 and 7, and parallel to the front side and parallel to the back side of each of the handle portions, handle, and the tool head(s), with the central plane being half way between said front side and said back side. See central plane CP portrayed for the handle and tool head in FIG. 7, and for the handle in FIG. 14.

Figure 5:
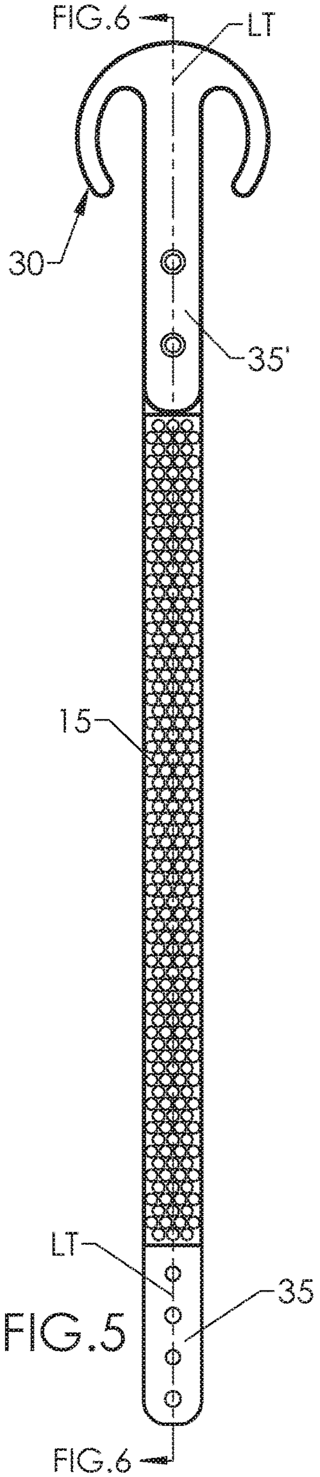
FIG. 5 is a side view of the embodiment of FIG. 4.
Figure 14:
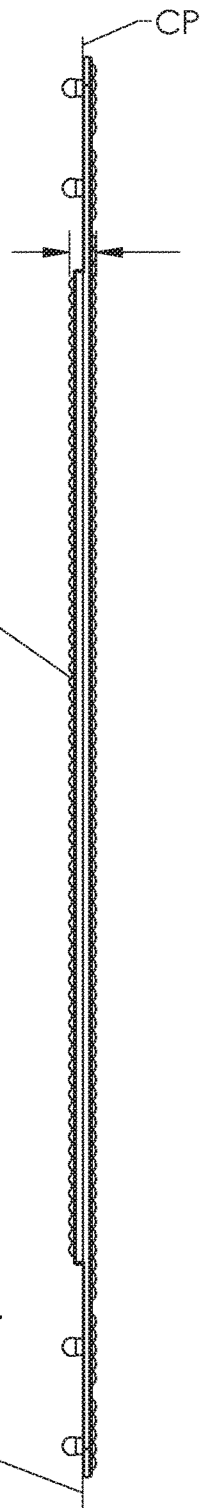
FIG. 14 is an edge view of the portion of the handle shown in FIG. 13.

By "partially flexible" is meant that the handle/shaft(s), and optionally also the tool heads, may flex in the directions into and out from the paper in FIG. 5 and left and right in FIGS. 7 and 14 (directions transverse to the central plane CP). It is preferred that the tool has little or no flexibility in the direction parallel to the central plane CP (left and right in FIG. 5 and into and out from the paper in FIGS. 7 and 14), in order to optimize accurate control and manipulation by one hand holding one end of the tool. These features, combined with resiliency of the tool, is desired for several reasons, including ease of manipulation through a sleeve and/along the users arm, with good control and increased comfort and safety. The feature of being flexible in said direction transverse to the central plane CP will allow the handle/shaft(s) to curve slightly inside the sleeve to match the shape of the sleeve and/or slide more effectively along the user's arm. But, it will be understood that if the tool were also very flexible in the direction parallel to the central plane CP, the tool would be less effective due to difficulty in controlling it when it is grasped and manipulated only from its proximal end. It also will be understood from this disclosure that a rigid tool handle/shaft could be difficult to use inside a top layer sleeve and/or could gouge the user.

The handle/shaft(s) 15, 20 of the tool 10 have rounded/smooth protrusions and/or other texture and/or for ease and comfort during use. For example, the front and rear sides of each handle portion/shaft, may have multiple rounded bumps (or "mounds") 40 located all or substantially along the length and all or substantially across the width (see W in FIG. 13), as may be seen to best advantage in FIGS. 4-7. The rounded bumps 40 prevents the tool 10 from catching on various types of fabrics and/or scraping the skin of the user. At the same time, the rounded bumps provide a soft, massaging sensation while being used. These bumps 60 also help direct the tool in a straight path due to the reduced friction with the user's skin.

The tool 10 has multiple tool head designs that can be used interchangeably to grab and secure a strap or other object, and, particularly, to grab and secure a bra strap in order to pull it down along the wearer's arm. The Figures portray four unique tool heads, or "hook-heads" that may snap interchangeably on each end of each handle/shaft(s). In use, preferably multiple of the preferred equal and identical handle portions/shaft are assembled into one unit, which increases the length of the tool compared to embodiments using only one shaft component. Then, two different tool heads are selected and snapped-onto opposing ends of the handle. By snapping apart the tool when not in use, the owner can easily transport the tool in a purse or luggage.

Figure 8:
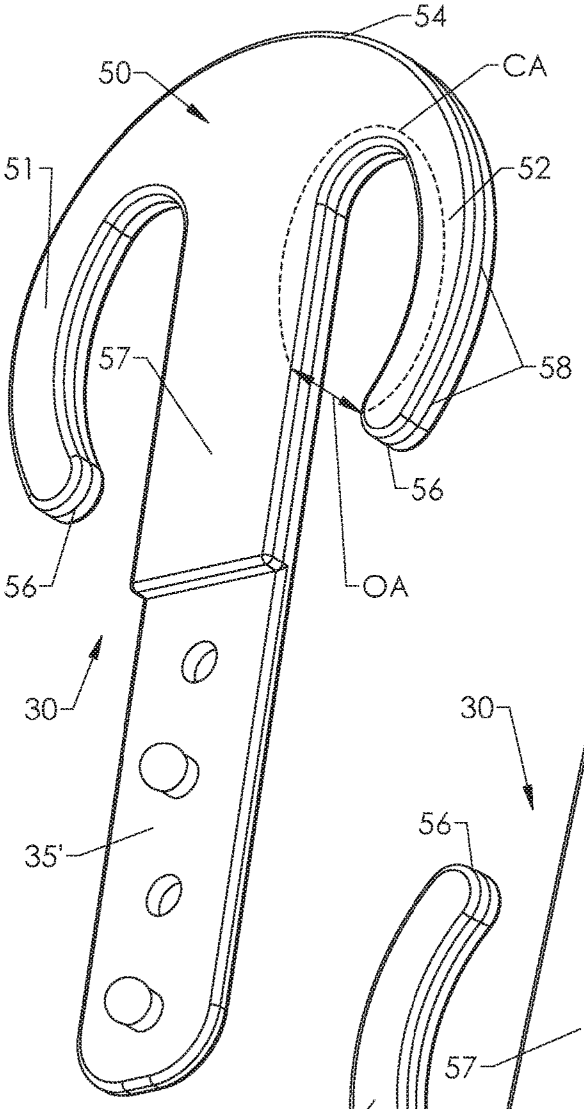
FIG. 8 is an enlarged "front-side" (or "connector side") perspective view of the tool head of FIG. 4, disconnected from any handle portion.
Figure 9:
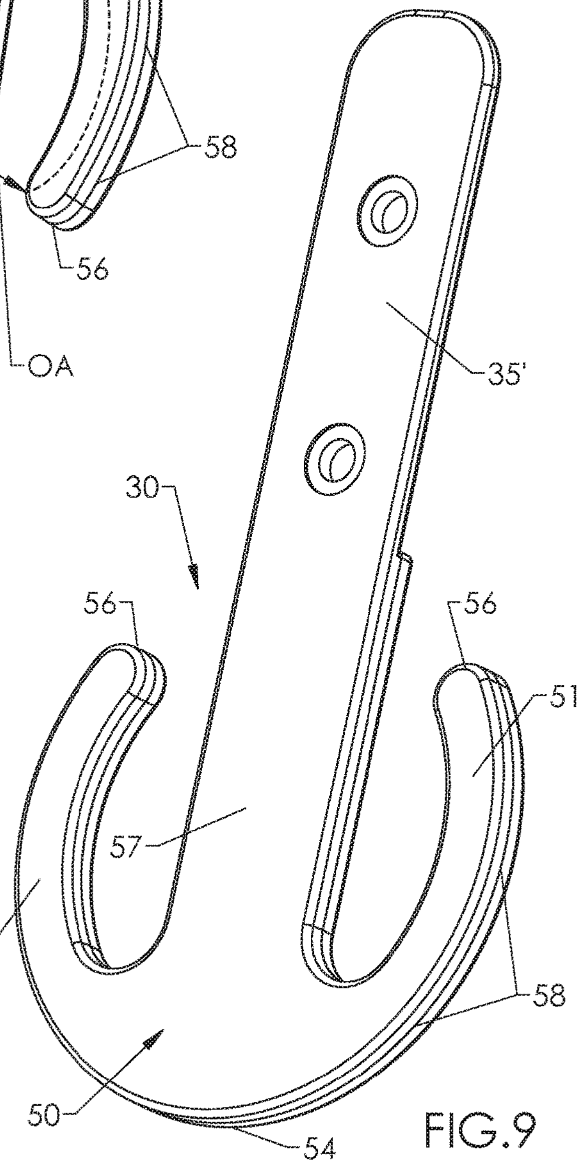
FIG. 9 is an enlarged "back-side" perspective view of the tool head of FIG. 4, disconnected from any handle portion.

Preferably, one or more of the tool heads is a multiple-hook head/end, for example, selected from those of FIGS. 8-12, or from other tool heads having two, three, four, or less-preferably even more hooks. FIGS. 8-12 illustrate several but not all effective styles of a multiple-hook end. FIGS. 8 and 9 illustrate tool head 30, with fastener portion 35', and hook portion 50 comprising two hooks 51, 52 that may be described as curving in opposite directions away from each other (one 51 counterclockwise and one 52 clockwise). The two hooks 51, 52 extend from the outermost end 54 of the hook portion 50, transversely away from the longitudinal axis of the tool head 30 (which is preferably coaxial with the longitudinal axes LT and LH) and extend toward the fastener portion 35' and inward toward each other and toward the handle/shaft to place their hook tips 56 close to the longitudinal body 57 and close to the fastener portion 35' of the tool head 30. The two hooks 51, 52 together define a generally circular outer perimeter 58 of the hook portion 30. Preferably, the hook portion 50 is symmetrical on the right and left of the longitudinal axis of the tool head 30 and longitudinal axes LT and LH. Optionally, one of the hooks on tool head 30 could be made larger than the other, to provide a larger interior space in the larger hook.

Figure 10:
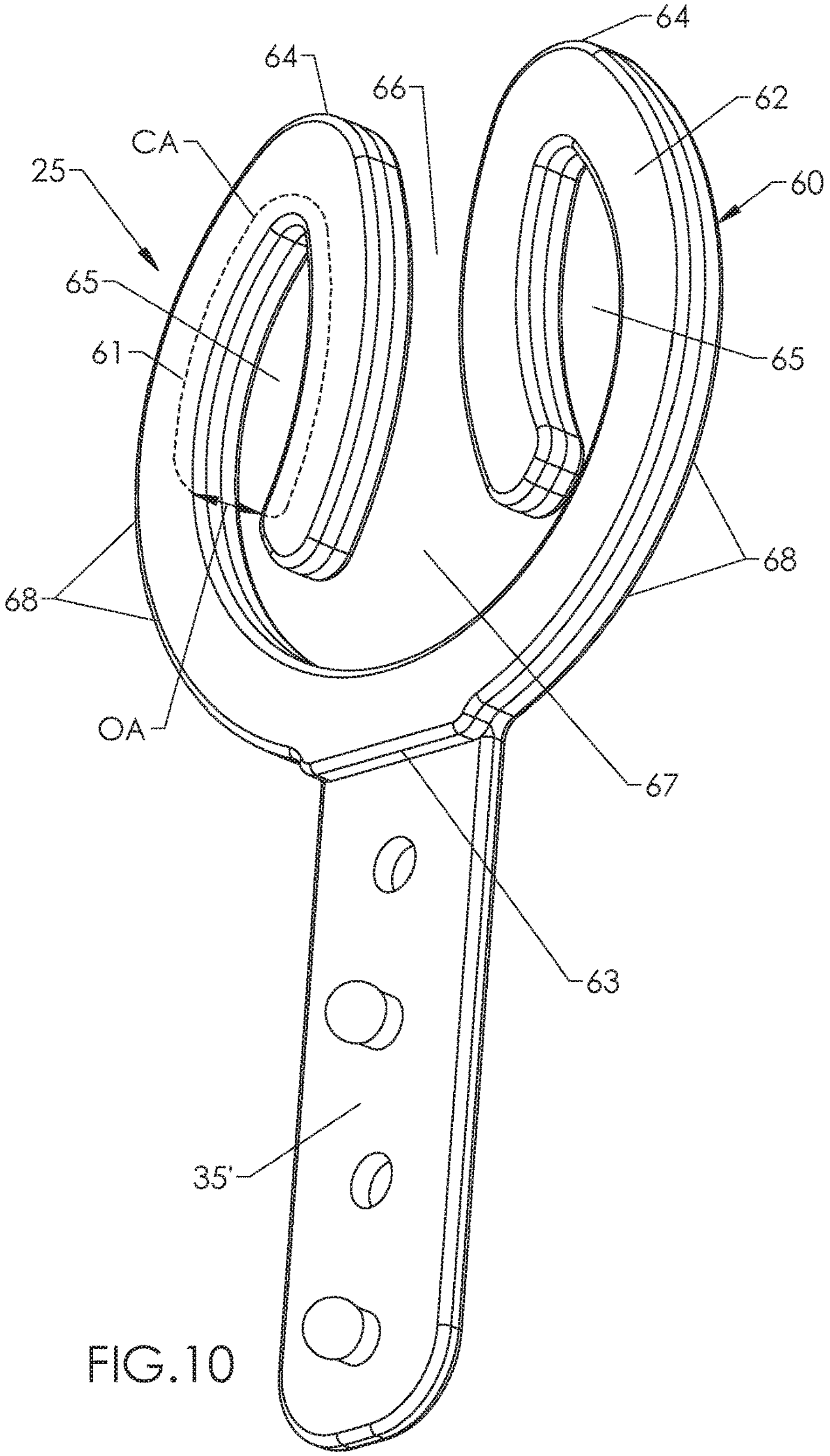
FIG. 10 is an enlarged "front-side" (or "connector side") perspective view of the tool head that is connected to the proximal handle portion in FIGS. 2 and 3, disconnected from any handle portion.

FIG. 10 illustrates tool head 25, which comprises a fastener portion 35', and hook portion 60 comprising hooks 61, 62 that may be described as curving in opposite directions toward each other (one 61 clockwise and one 62 counterclockwise). The hooks 61, 62 extend away from their common inner/base end 63, away from the longitudinal axis of the tool head 25 and away from the fastener portion 35', curve toward each other, and turn about 180 degrees at their outermost ends 64 to extend toward the fastener portion 35'. The two hooks 61, 62 each define an interior hook space 65 and, together, define a central passage 66 between them and a central space 67. A user will push/manipulate the hook portion 60 against an object, typically a strap, so that it slides through the central passage 66 until it reaches the central space 67, upon which the tool will manipulated/pulled so that the object/strap slides into one or the other interior hook space 65. Together the hooks 61, 62 define a generally circular outer perimeter 68 of the hook portion. Preferably, the hook portion 60 is symmetrical on the right and left of the longitudinal axis of the tool head 25. Optionally, one of the hooks on tool head 25 could be made larger than the other, to provide a larger interior hook space in the larger hook.

Figure 11:
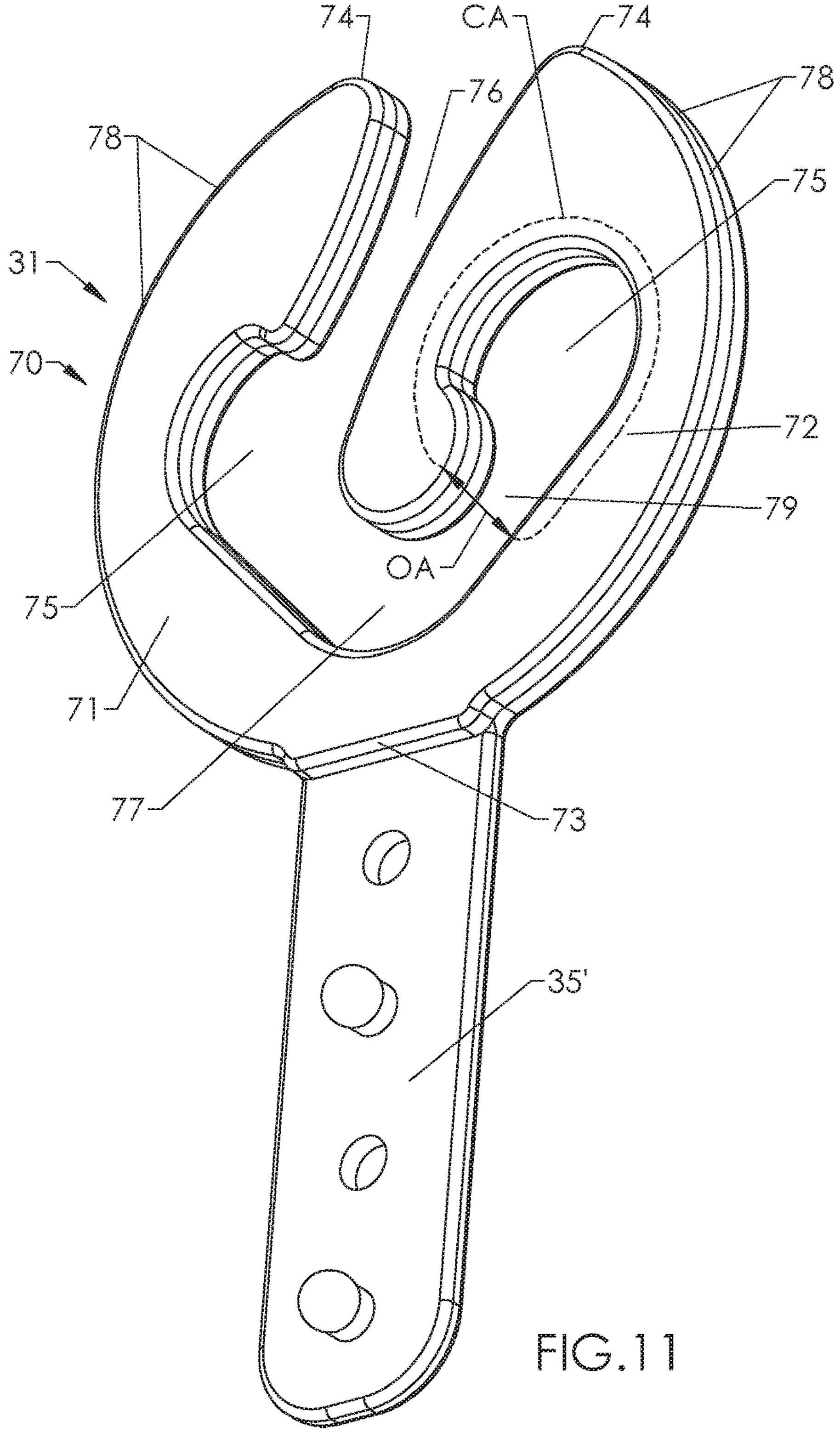
FIG. 11 is a "front-side" (or "connector side") view of an alternative tool head for connection to one or both of the handle portions of FIG. 1.

FIG. 11 illustrates another tool head 31 that comprises a fastener portion 35', and hook portion 70 comprising hooks 71, 72 that may be described as curving in opposite directions toward each other (one 71 clockwise and one 72 counterclockwise). The hooks 71, 72 extend away from their common inner/base end 74, away from the longitudinal axis of the tool head 71 and away from the fastener portion 35', to curve toward each other near their outermost ends 74 where hook 71 terminates and where hook 74 turns about 180 degrees to extend toward the fastener portion 35'. Together the hooks 71, 72 define a generally circular outer perimeter 78 of the hook portion 70. The two hooks 71, 72 each define a central passage 76 between them that leads/communicates with a central space 77 near the base end 74, and two interior hook spaces 75. The interior hook space 75 of hook 71 may be likened to a recess in a side of the hook interior surface. The interior hook space 75 of hook 72, however, may be likened to an aperture or hole with a single small opening into the aperture/hole, as it is substantially surrounded by the hook interior surface except at a narrow opening 79. A user will push/manipulate the hook portion 70 against an object, typically a strap, so that it slides through the central passage 76 until it reaches and is received in the hook space 75 of hook 71 or the central space 77. If desired for better or different control and manipulation of the object/strap, the user may continue to push/manipulate the hook portion 70 until the object/strap slides into the center space 77 and then into the interior hook space 75 of hook 72. When an object/strap is received in the interior hook space 75 of hook 72, which comprises the narrow single opening 79, the object/strap tends to be securely captured and can be pulled in multiple directions reliably and with confidence in the result. Hook portion 70 is asymmetrical on the right and left of the longitudinal axis of the tool head 31 due to the differently-shaped hooks 71, 72.

Figure 12:
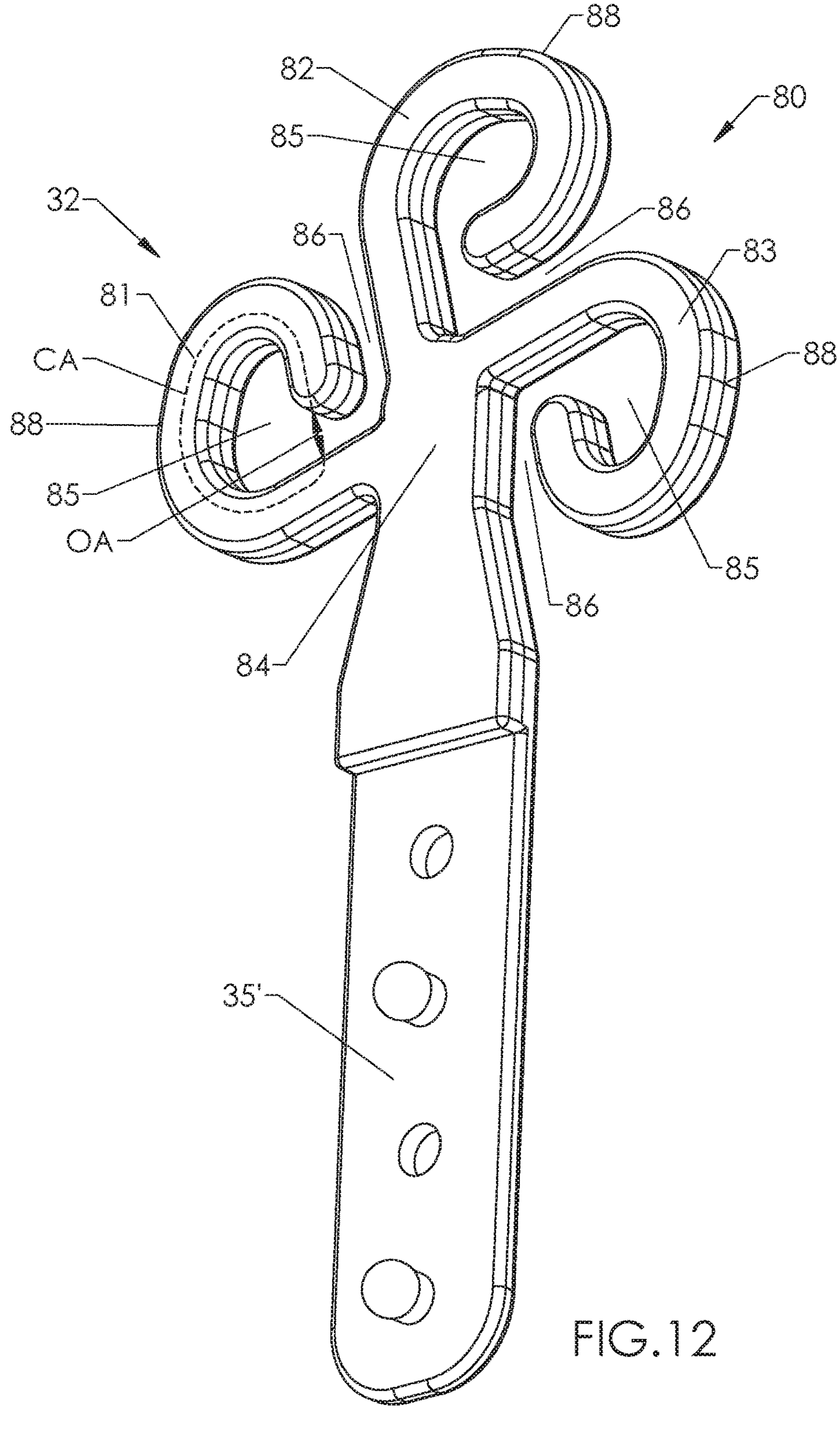
FIG. 12 is "front-side" (or "connector side") view of yet another alternative tool head for connection to one or both of the handle portions of FIG. 1.

FIG. 12 illustrates tool head 32, which comprises a fastener portion 35', and hook portion 80 comprising three hooks 81, 82, 83, which may be described as all curving the same direction ("clockwise"). The hooks 81, 82, 83 extend away from their common base 84. The hooks 81, 82, 83 each define an interior hook space 85 reached by three passages 86, that is, one for each hook 81, 82, 83. A user will push/manipulate the hook portion 80 against an object, typically a strap, so that it slides through the passage 86 of one of the hooks 81, 82, 83, until it reaches and is captured in that hook's interior hook space 85, after which the tool will manipulated/pulled to manipulate/pull the object/strap. Each hook 81, 82, 83 defines its own, separate generally circular outer perimeter 88. Preferably, the hooks 81, 82, 83 are the same size, but, optionally, the hooks could be made in multiple sizes to provide differently-sized interior hook spaces.

Certain embodiments of the tool heads, therefore, may be described as being "hook ends" that preferably provide one or more sets of two or more hooks for connection to one or both ends of the handle/shaft. In certain embodiments, the hooks of the set(s) curve away from each other, and in other embodiments the hooks of the set(s) curve toward each other, and in other embodiments the hooks of the set(s) curve the same direction. These multiple hook ends are adapted to capture and control a strap (such as a bra strap) more effectively than a single hook, because at least one of the hooks, and preferably both or all the hooks on a tool head extend almost a full circle or almost a full oval to define the interior space of the hook(s), with the only opening into the interior space being relatively narrow in width so that the object/strap being received through the opening into the interior space will be likely to remain in the interior space, especially when the tool and the distal tool head are being pulled proximally. In other words, the hook(s) may extend/curve to form a circular or oval shape, for example, shown by the dashed line semi-circle or semi-oval labeled CA ("curvature angle" or "curvature amount") in FIGS. 8-12. The relatively narrow opening has a width shown by OA ("opening angle" or "opening amount") in FIGS. 8-12. Thus, each tool head may be described as comprising at least one nearly-closed hook with a single small/narrow opening. For example, these multiple hook ends are adapted to capture and control a strap (such as a bra strap) more effectively than a single hook for example reasons: 1) the device can be used in multiple orientations and can still capture and pull the strap proximally, typically without the user having to rotate the device on its longitudinal axis, and 2) at least one of the hooks on each multiple-hook end is preferably almost closed, for example, curving 300-340 degrees or more preferably a 300-330 degrees (curvature angle CA), and therefore having an opening/passage into the interior space of the hook that corresponds generally to 20-60 degrees or more preferably a 30-60 degrees (opening angle OA). Also, by virtue of their rounded/non-sharp structure and their curving to be almost closed, as explained above, the hooks are comfortable, non-poking, and non-injuring to the user, who may push or slide the hook in any direction against their skin during use of the device, without any pointed ends or hooks likely to contact the skin. For example, in a bra strap use, even after capturing the bra strap in the interior space of one of the hooks of a multiple-hook end, and while pulling the bra strap toward the forearm of the user, neither the multiple hooks on the hook end that has captured the strap nor the multiple hooks on the opposite hook end will poke the user due to the rounded/non-sharp structure of each preferred hook and the preferred "almost closed" configuration of each hook, as explained above.

Figure 4:
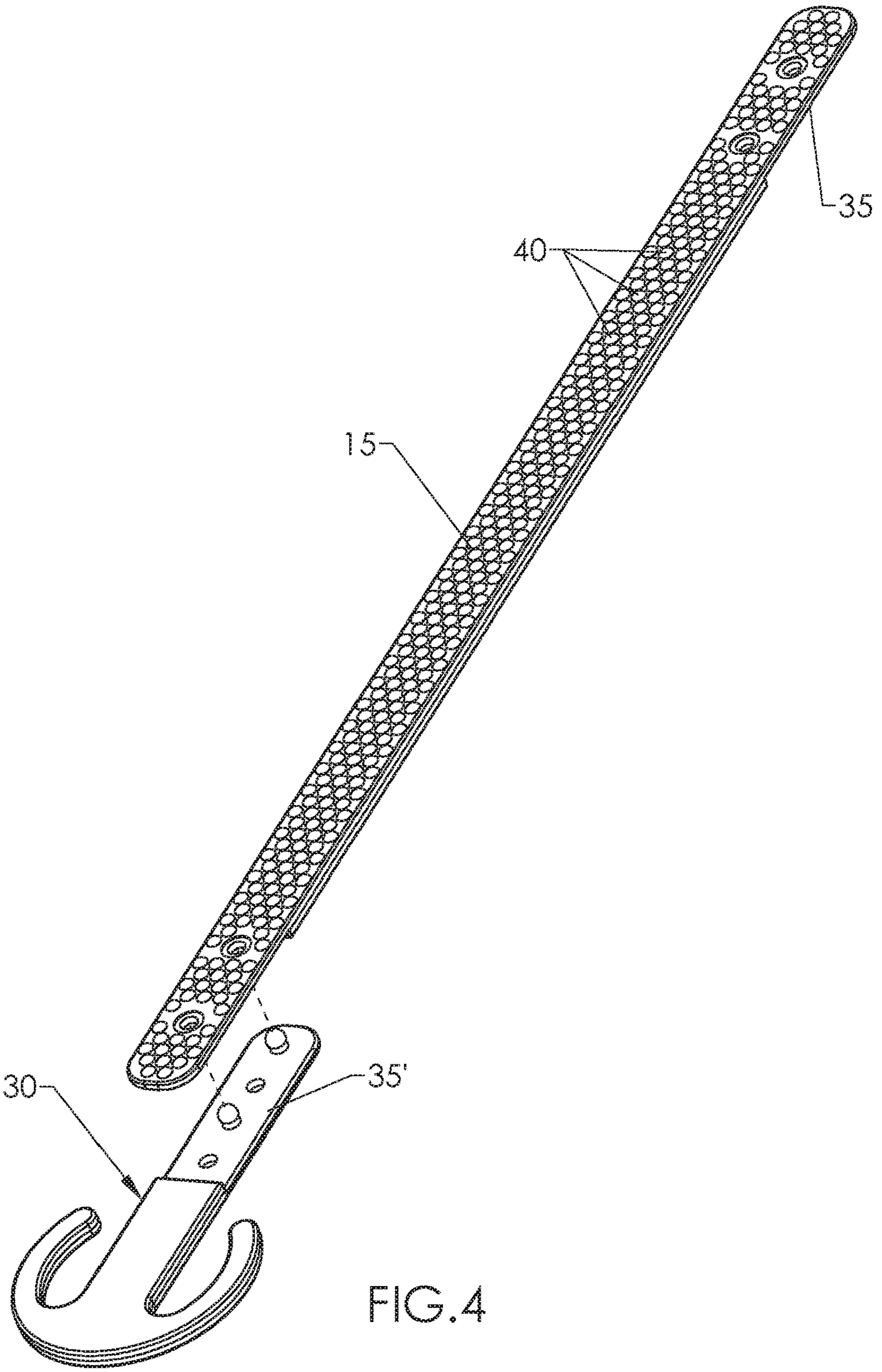
FIG. 4 is a close-up of the proximal handle portion of the tool of FIGS. 2 and 3, wherein the distal end tool head of FIGS. 2 and 3 is being connected to said proximal handle portion, to show interchangeability of the handle portions and the tool head components.
Figure 13:
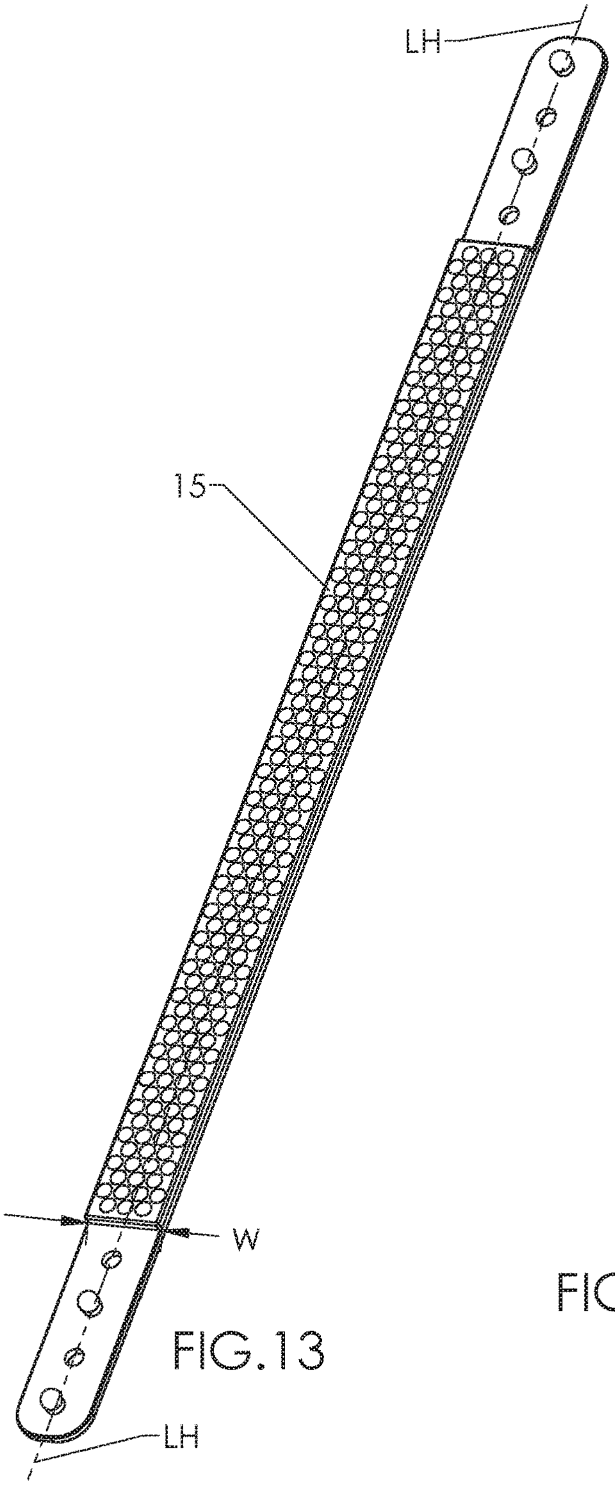
FIG. 13 is a "front-side" (or "connector side") perspective view of a portion of the handle of FIG. 1.

FIGS. 13 and 14 provide perspective views of the front (connection) side and an edge view, respectively, of a single handle portion/shaft 15. A back side perspective view of handle/shaft 15 is shown in FIG. 4. FIG. 13 indicates the longitudinal axis LH of the handle portion/shaft 15, which is coaxial with the longitudinal axis of the preferred tool heads. FIG. 13 also indicates the width W, and FIG. 14 indicates the thickness T, of the handle portion/shaft 15.

Although this disclosed technology has been described above, and drawn in Figures, with reference to particular means, materials and embodiments, it is to be understood that the disclosed technology is not limited to these disclosed particulars, but extends instead to all equivalents within the broad scope of the following claims.

The invention claimed is:

1. A hand-held tool for reaching and manipulating objects including straps, the tool comprising:

an elongated handle comprising at least one elongated shaft, the handle having a front side, a back side, a proximal end and a distal end each having a fastener portion, a longitudinal axis between said proximal end and said distal end, and a longitudinal central plane extending through the longitudinal axis and parallel to said front side and said back side;

a tool head that is connectable to the fastener portions of the proximal and distal ends of the handle;

the tool head having an inner end and having an outer end comprising multiple hooks, wherein, when the tool head is connected to the distal end of the handle, at least one of the multiple hooks curves, in a hook plane that is parallel to said longitudinal central plane of the handle, to form a generally circular or oval shape around and defining an interior space with an opening into the interior space for receiving the object to be manipulated, wherein said opening is near said inner end so that the object received through the opening and into the interior space will remain in the interior space when the tool is pulled in a proximal direction.

2. The hand-held tool as in claim 1, wherein said at least one of the multiple hooks curves 300-340 degrees to form said generally circular or oval shape and the opening into said interior space extends 20-60 degrees.

3. The hand-held tool as in claim 1, wherein said at least one of the multiple hooks comprises two hooks that curve in said longitudinal central plane of the handle to form two generally circular or oval shapes around and defining two interior spaces each having an opening near said inner end so that the object received through the opening and into the interior space of either of said two hooks will remain in the interior space when the tool is pulled in a proximal direction.

4. The hand-held tool as in claim 3, wherein both of the two hooks curve 300-340 degrees to form said generally circular or oval shapes and the two openings into the interior spaces each extends 20-60 degrees.

5. The hand-held tool as in claim 1, wherein said at least one elongated shaft comprises two identical shafts connected together.

6. The hand-held tool as in claim 1, wherein the multiple hooks comprise two hooks curving toward each other.

7. The hand-held tool as in claim 1, wherein the multiple hooks comprise two hooks curving away from each other.

8. The hand-held tool as in claim 1, wherein the multiple hooks comprise two hooks curving in the same direction.

9. The hand-held tool as in claim 1, wherein the multiple hooks comprise four hooks curving in the same direction.

10. The hand-held tool as in claim 1, wherein the fastener portions on the proximal end and the distal end of the handle are identical.

11. The hand-held tool as in claim 1, wherein the fastener portions each comprise snap members for snapping to cooperating snap members on said tool head.

12. The hand-held tool as in claim 5, wherein said two identical shafts are connected together by snap members of each of the two identical shafts that snap-together to form the handle.

13. The hand-held tool as in claim 11, wherein said snap members of the fastener portions of the handle and the cooperating snap members of the tool head each comprise multiple protruding snap portions and multiple snap-receiving apertures so that the protruding snap portions of the fastener portions of the handle snap into the snap-receiving apertures of the tool head, and the snap-receiving apertures of the fastener portions of the handle receiver the protruding snap portions of the tool head.

14. The hand-held tool as in claim 12, wherein said snap members of the fastener portions of the handle comprise multiple protruding snap portions and multiple snap-receiving apertures so that the protruding snap portions of a first of said two identical shafts snap into the snap-receiving apertures of a second of said two identical shafts, and the protruding snap portions of the second of said two identical shafts snap into the snap-receiving apertures of the first of said two identical shafts.

15. The hand-held tool as in claim 1 comprising additional tool heads that each have at least one hook and that are connectable to the fastener portions of the proximal end and the distal end of the handle.

16. The hand-held tool as in claim 15, wherein each of said additional tool heads have at least two hooks.

17. The hand-held tool as in claim 15, wherein the at least two hooks of each of the additional tool head each curve in a hook plane that is parallel to said longitudinal central plane of the handle, so that, when said tool head and any of the additional tool heads are connected to the handle, the tool is substantially flat and planar.

18. The hand-held tool as in claim 1, wherein the handle comprises rounded bumps substantially all along and all across the width of the front side and back side of the handle for reducing sticking-to or catching on a user's skin and increased direct-path accuracy when moving the tool along or against the skin or along or against clothing on the user.

19. The hand-held tool as in claim 18, wherein the handle comprises rounded bumps substantially all along and all across the width of the front side and back side of the handle for reducing sticking-to or catching on a user's skin and increased direct-path accuracy when moving the tool along or against the skin or along or against clothing on the user.

* * * * *